United States Patent
Stopfer

(10) Patent No.: US 12,092,492 B2
(45) Date of Patent: Sep. 17, 2024

(54) INDUCTIVE LINEAR DISPLACEMENT SENSOR

(71) Applicant: Schaeffler Technologies AG & Co. KG, Herzogenaurach (DE)

(72) Inventor: Thilo Stopfer, Herzogenaurach (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 93 days.

(21) Appl. No.: 17/912,604

(22) PCT Filed: Mar. 1, 2021

(86) PCT No.: PCT/DE2021/100198
§ 371 (c)(1),
(2) Date: Sep. 19, 2022

(87) PCT Pub. No.: WO2021/190689
PCT Pub. Date: Sep. 30, 2021

(65) Prior Publication Data
US 2023/0314179 A1    Oct. 5, 2023

(30) Foreign Application Priority Data
Mar. 27, 2020    (DE) .................. 10 2020 108 461.7

(51) Int. Cl.
*G01D 5/20* (2006.01)
*G01D 18/00* (2006.01)

(52) U.S. Cl.
CPC .............. *G01D 5/20* (2013.01); *G01D 18/00* (2013.01)

(58) Field of Classification Search
CPC ......... G01D 5/20; G01D 18/00; G01D 5/2291
See application file for complete search history.

(56) References Cited

U.S. PATENT DOCUMENTS

| | | | | |
|---|---|---|---|---|
| 4,591,795 A | * | 5/1986 | McCorkle | G01D 5/2208 327/104 |
| 7,319,331 B2 | * | 1/2008 | Pelegri | G01V 3/28 324/339 |
| 11,692,852 B2 | * | 7/2023 | Biggs | G01D 5/2053 324/207.17 |
| 2002/0043972 A1 | * | 4/2002 | Irle | G01D 5/204 324/207.17 |
| 2009/0256555 A1 | | 10/2009 | Elliott et al. | |
| 2011/0227556 A1 | * | 9/2011 | Ivchenko | G01D 5/2291 323/318 |
| 2015/0070003 A1 | * | 3/2015 | Elliott | G01D 11/245 324/207.2 |
| 2015/0308860 A1 | | 10/2015 | Wang et al. | |
| 2021/0241961 A1 | * | 8/2021 | Ludwig | H01F 27/28 |
| 2021/0302206 A1 | * | 9/2021 | Ferreira Da Cunha | G01D 5/2053 |
| 2022/0065662 A1 | * | 3/2022 | Lu | G01D 5/20 |

FOREIGN PATENT DOCUMENTS

DE    102015206678 A1    10/2016

* cited by examiner

*Primary Examiner* — Akm Zakaria

(57) ABSTRACT

The disclosure relates to an inductive linear displacement sensor that includes a primary coil and two secondary coils inductively coupled to the primary coil. The linear displacement sensor has a calibration coil inductively coupled to the primary coil. The calibration coil is arranged such that a signal produced by the calibration coil has only one zero crossing at the center of the linear displacement sensor.

19 Claims, 5 Drawing Sheets

INDUCTIVE LINEAR DISPLACEMENT SENSOR

CROSS-REFERENCE TO RELATED APPLICATIONS

This application is the U.S. National Phase of PCT Application No. PCT/DE2021/100198 filed on Mar. 1, 2021, which claims priority to DE 10 2020 108 461.7 filed on Mar. 27, 2020, the entire disclosures of which are incorporated by reference herein.

TECHNICAL FIELD

The disclosure relates to an inductive linear displacement sensor.

BACKGROUND

Such inductive linear displacement sensors are used, for example, in the automotive sector, in large machines and for automatic meter readings. Various concepts are known, for example so-called linear variable differential transformers, in which the signals, i.e. the voltages induced by the primary coil, of the secondary coils are subtracted from one another. Alternatively, it is possible to look at the ratio of the signals. A linear characteristic curve is produced from the signals, which can be used to draw conclusions about the displacement.

Before using such an inductive linear displacement sensor, a calibration is necessary, a so-called "teaching" of the sensor, wherein, among other things, the zero position of the sensor must be determined. This is usually in the center of the measuring range and thus in the center of the characteristic curve. However, the disadvantage here is that various parameters have an influence on the sensor and thus also on the characteristic curve, so that, in the worst case, zero position detection is no longer possible.

SUMMARY

Against this background, the object therefore arises of improving an inductive linear displacement sensor in such a way that unambiguous zero position detection is made possible without, however, increasing the size of the proven sensor design.

This object is achieved by an inductive linear displacement sensor comprising a primary coil and two secondary coils, wherein the secondary coils are inductively coupled to the primary coil, wherein the linear displacement sensor has a calibration coil, which is inductively coupled to the primary coil, wherein the calibration coil is arranged such that a signal produced by the calibration coil has only one zero crossing in the center of the linear displacement sensor. The calibration coil can be provided in such a way that the signal produced by it assumes a different sign on the two sides of the center and, potentially, a constant value.

With the linear displacement sensor according to the disclosure, calibration can be performed unambiguously with respect to the center of the linear displacement sensor or the center of the characteristic curve in an advantageous manner due to the unambiguous zero position of the signal of the calibration coil. Furthermore, this calibration is made possible in a particularly simple manner, which means that complicated control electronics for evaluating the signal of the calibration coil can be dispensed with. Furthermore, the calibration coil provides an additional diagnostics option for the linear displacement sensor. This means that recalibration can be performed easily and reliably at any time during the operating life of the linear displacement sensor, if required. In particular, this calibration option via the calibration coil is advantageously independent of other methods based on the evaluation of the signals of the secondary coils.

According to an embodiment of the disclosure, the linear displacement sensor is designed to be planar, wherein in particular the coils are designed to be planar. The person skilled in the art understands that in the present case the "coils" are to be understood as the primary coil, the secondary coils as well as the calibration coil. Furthermore, in the following the term "sensor" is used synonymously for the linear displacement sensor in the following. The fact that the sensor is designed to be planar means in particular that the coils are arranged in a single plane, i.e. they are designed to be flat. The linear displacement sensor can essentially have a cuboid shape. The linear displacement sensor can have a main extension plane that coincides with the plane in which the coils are arranged and a main extension direction that corresponds to the linear direction along which the displacement is determined. The sensor thus advantageously requires little space and provides a flat surface along which a position sensor can be moved.

According to a further embodiment of the disclosure, the linear displacement sensor is provided as a circuit board, wherein the coils are designed as single-layer or multilayer conductive tracks. Such circuit boards are also known as printed circuit boards and can be manufactured easily and inexpensively using proven techniques. By designing the coils as conductive tracks, the primary coil, the secondary coils and the calibration coil can be provided in a simple and reliable manner.

The circuit board can be provided in multiple layers, wherein the coils are provided in one plane of the circuit board, in particular in an uppermost plane, wherein in a further plane, in particular below the uppermost plane, at least one control electronics unit for operating the primary coil and/or for processing the signals produced by the secondary coils and/or the calibration coil is arranged, wherein in particular the control electronics unit for processing the signals produced by the secondary coils is designed as an integrated circuit. The control electronics unit can be at least partially designed as an application-specific integrated circuit (ASIC). Such chips are standard components, so that the control electronics unit can be designed cost-effectively. The person skilled in the art understands that appropriate electrical connections must be provided between the various planes of the circuit board. In an advantageous way, both the coils and the control electronics unit can thus be provided in a circuit board in a space-saving manner.

An embodiment of the disclosure provides that the primary coil is operated with an, in particular high-frequency, alternating field. The person skilled in the art understands that this produces an inductive oscillating circuit in which the secondary coils, but in particular also the calibration coil, are inductively coupled to the primary coil.

According to yet another embodiment of the present disclosure, it is provided that the secondary coils are designed in a sinusoidal geometry shifted relative to one another, in particular by $\pi/2$, wherein the primary coil can be designed in a rectangular geometry. The person skilled in the art understands that this is in particular synonymous with one secondary coil being designed in a sinusoidal geometry and the other coil in a cosinusoidal geometry. In particular, the secondary coils are designed with only one measuring period. The corresponding geometries advantageously ensure that the secondary coils produce a sinusoidal or cosinusoidal signal. The person skilled in the art understands that these signals can be combined via their quotient and the arctangent function to form an, at least essentially, linear signal. This means that the secondary coils produce a linear characteristic curve from which the linear displacement can be determined.

According to a particularly advantageous embodiment, the calibration coil is designed in such a way that it extends essentially parallel to the primary coil on both sides of the center and changes sides in the center of the linear displacement sensor transverse to the main extension direction. In particular, this means that the signal produced by the calibration coil changes the sign in the center of the linear displacement sensor, so that, for example, a positive voltage is measured to the left of the center and a negative voltage to the right of the center. The signal from the calibration coil therefore has only one zero crossing, namely at the center of the linear displacement sensor. The calibration coil can be provided planar and/or designed to be doubly axisymmetric, in particular with respect to an axis extending in the main extension direction and through the center and with respect to an axis extending transverse to the main extension direction and through the center. The calibration coil can have, at the ends of the linear displacement sensor which are maximally distant from one another with respect to the main extension direction, a maximum distance of its windings in a direction transverse to the main extension direction. According to the disclosure, it is of significant importance that the calibration coil has exactly one zero crossing over the entire measuring range. In this regard, various forms are conceivable. For example, the essentially rectangular shape described above, a shape that is essentially two triangles touching at their apex, or even a sinusoidal shape that has only a single zero crossing. This provides a particularly advantageous definition of an unambiguous zero position, which can be used to calibrate the center of the linear displacement sensor in a simple manner.

It is provided that the linear displacement sensor can be encapsulated, wherein the linear displacement sensor is surrounded by a plastic material. This means that the circuit board has no direct contact with the environment, but is surrounded by a material which can have no influence on the magnetic fields. This advantageously provides a linear displacement sensor that is protected against environmental influences such as dirt, heat, lubricants and liquids.

According to a further advantageous embodiment, it is provided that an analog circuit, in particular an operational amplifier, is provided for detecting and/or processing the signal produced by the calibration coil. The commercially available ASIC chips usually have only two inputs, corresponding to the two secondary coils. Advantageously, by using an analog circuit such as an operational amplifier, there is no need to provide proprietary control circuitry. In particular, due to the special design of the calibration coil, it is possible in a particularly advantageous way that only the amplitude of the calibration coil signal has to be output. This also means that, in an advantageous manner, the circuit of the calibration coil is provided independently of the circuit of the secondary coils. Thus, an additional diagnostics option is provided in a particularly advantageous manner, which is independent of the signal processing/availability at the sensor output or of the signals of the inputs of an ASIC chip, in particular in the case of a usual design of an inductive linear displacement sensor.

A further object of the disclosure is a system comprising a linear displacement sensor according to the disclosure and a position sensor movably arranged therewith, in particular in a linear direction relative to the linear displacement sensor. Such a position sensor can be made of a magnetic material, in particular a ferrite. Alternatively or in addition, the position sensor can have a resonance circuit. Such a resonance circuit can be implemented, for example, analogously to the linear displacement sensor as a circuit board with a coil of conductive tracks and, potentially, a capacitor.

The position sensor can be guided on the linear displacement sensor, for example via lateral grooves that extend over the length of the linear displacement sensor, in which corresponding guide rails of the position sensor engage. The person skilled in the art understands that other relative types of movable mounting between the linear displacement sensor and the position sensor are also possible. Alternatively, the position sensor can be moved freely relative to the linear displacement sensor. The inductive linear displacement sensor according to the disclosure is advantageously insensitive to movements of the position sensor transverse to the measuring direction, in particular transverse to the main extension direction of the linear displacement sensor.

With the system according to the disclosure, the same advantages can be achieved as have already been described in connection with the linear displacement sensor according to the disclosure. The advantageous embodiments and features explained in connection with this sensor can, alone or in combination, also be applied to the system.

Yet another object of the present disclosure is a method for linear displacement determination with a linear displacement sensor or system according to the disclosure, wherein the primary coil is operated with an alternating field and wherein by means of the signal produced by the calibration coil a characteristic curve of the linear displacement sensor is calibrated with respect to the center of the linear displacement sensor. The person skilled in the art understands that this is made possible by the special design of the calibration coil.

BRIEF DESCRIPTION OF THE DRAWINGS

Further details and advantages of the disclosure will be explained below with reference to the exemplary embodiment shown in the drawings. In the figures.

DETAILED DESCRIPTION

Figure 1:
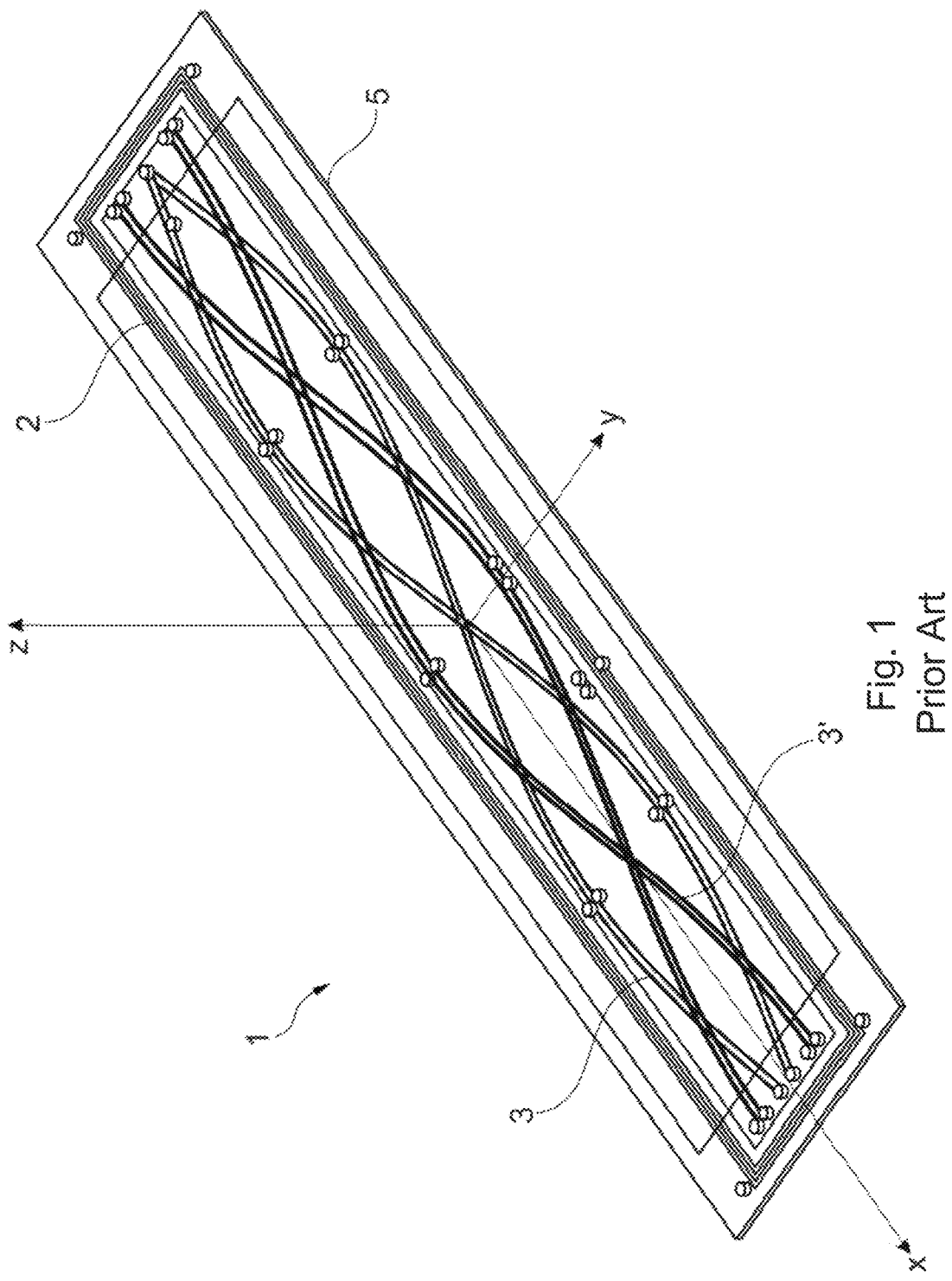
FIG. 1 shows an inductive linear displacement sensor according to the prior art.

In FIG. 1, an inductive linear displacement sensor 1 according to the prior art is shown. The linear displacement sensor 1 is designed here as a circuit board 5. For the sake of clarity, only one upper functional layer is shown here. Only by way of example, the Cartesian coordinate system shown is used in the following, wherein the x-direction corresponds to a main extension direction of the linear displacement sensor 1 and the plane formed by the x- and y-axes corresponds to a main extension plane of the linear displacement sensor 1. Not shown here are, in particular, further layers of the circuit board 5 which have, among other things, the control electronics unit and further elements required for operation of the linear displacement sensor 1 but known to the person skilled in the art.

In the circuit board 5, for example, various coils 2, 3, 3' are realized in the form of conductive tracks. In the present case, a rectangular primary coil 2 is provided, as well as two secondary coils 3, 3' within the rectangle spanned by the primary coil 2, which are sinusoidal and cosinusoidal respectively, i.e. are phase-shifted relative to one another, in particular by a quarter period, in other words by $\pi/2$.

Figure 2:
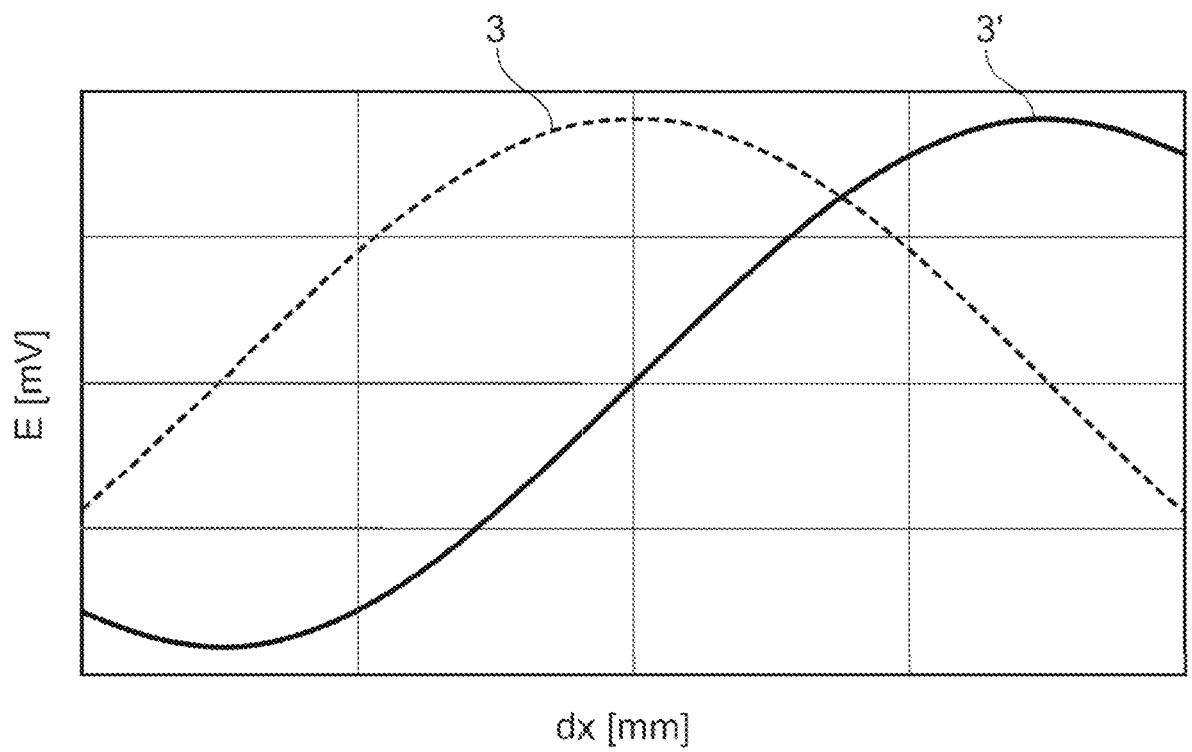
FIG. 2 shows the (useful) signals of the secondary coils of the linear displacement sensor according to FIG. 1.

The illustration in FIG. 2 shows a graph in which the (useful) signals of the secondary coils 3, 3' of the linear displacement sensor 1 according to FIG. 1 are plotted over the linear displacement, here in parallel to the x-axis. It can be seen that the signals have a sinusoidal or cosinusoidal curve, wherein, however, less than one complete period is passed through. From the ratio of the signals of the secondary coils 3, 3', a linear characteristic curve can be obtained via the arctangent function, or the arctan 2 function, from which the linear displacement can then be determined.

Before using such an inductive linear displacement sensor 1 for the first time, however, the complete measuring path must be traversed and measured once in order to calibrate the sensor 1, in particular with regard to the center of the sensor 1. However, this calibration is sensitive to a variety of influences and can therefore shift in certain circumstances, which is not desirable.

Figure 3:
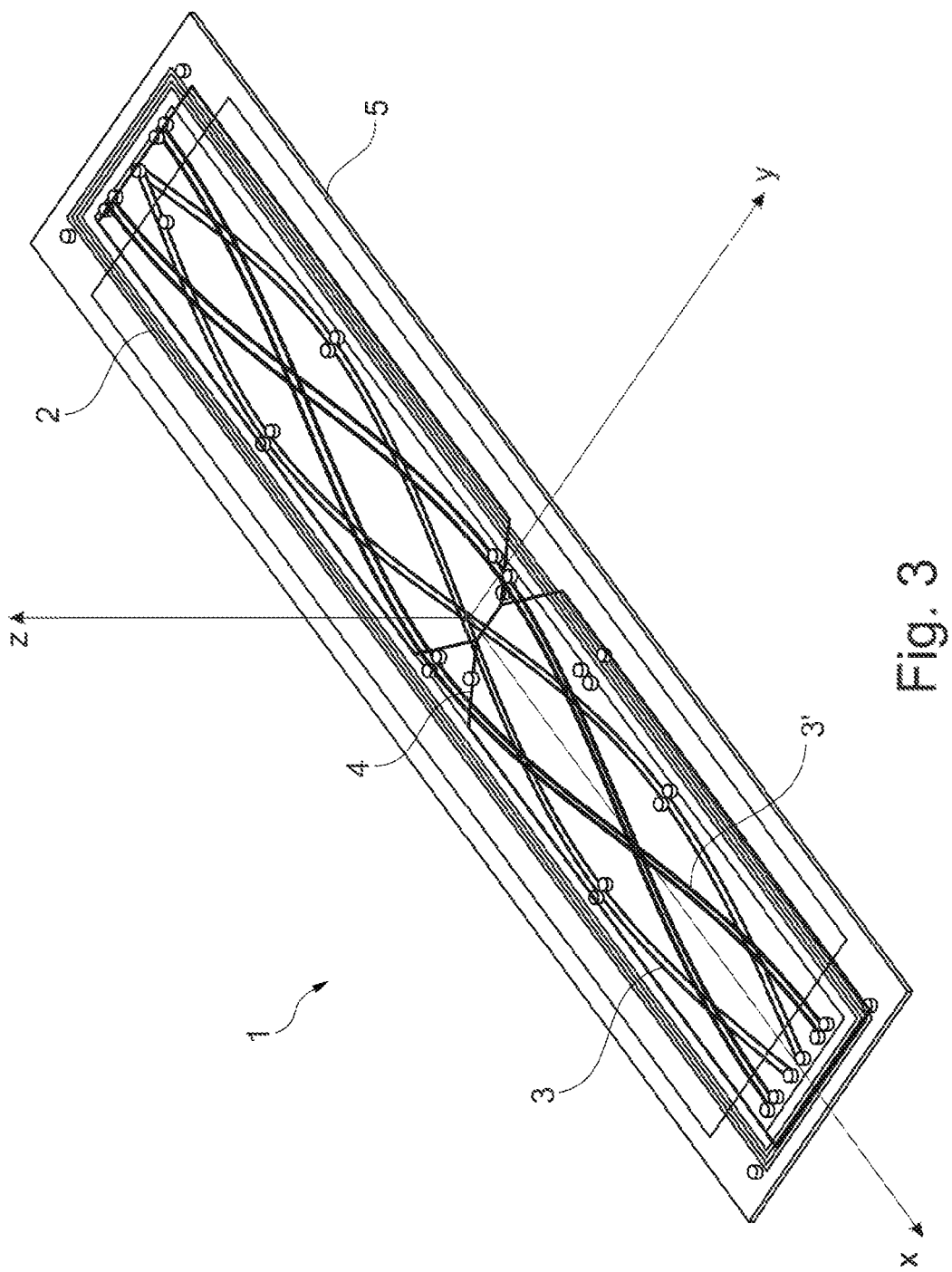
FIG. 3 shows an inductive linear displacement sensor according to an advantageous embodiment of the present disclosure.

According to the disclosure, this problem is solved with an inductive linear displacement sensor 1 as shown according to an advantageous embodiment in FIG. 3. In this case, the structure with regard to the coil geometry of the primary coil 2 and the secondary coils 3, 3' essentially corresponds to the structure explained in connection with FIG. 1. In addition, however, a calibration coil 4 is provided here, which in this case extends to the left of center parallel to the upper conductive track of the primary coil 2 and to the right of center parallel to the lower conductive track of the primary coil 2. The calibration coil 4 crosses the circuit board exactly in the center. In other words, the calibration coil 4 is provided in such a way that it has a zero crossing in its signal exactly in the center of the linear displacement sensor 1 and has a constant but inverted-sign value on both sides of the center.

This unambiguously defines the center of the linear displacement sensor 1. The fact that the amplitude is essentially constant on both sides of the center also makes it advantageous to dispense with a complex control electronics unit.

Figure 4:
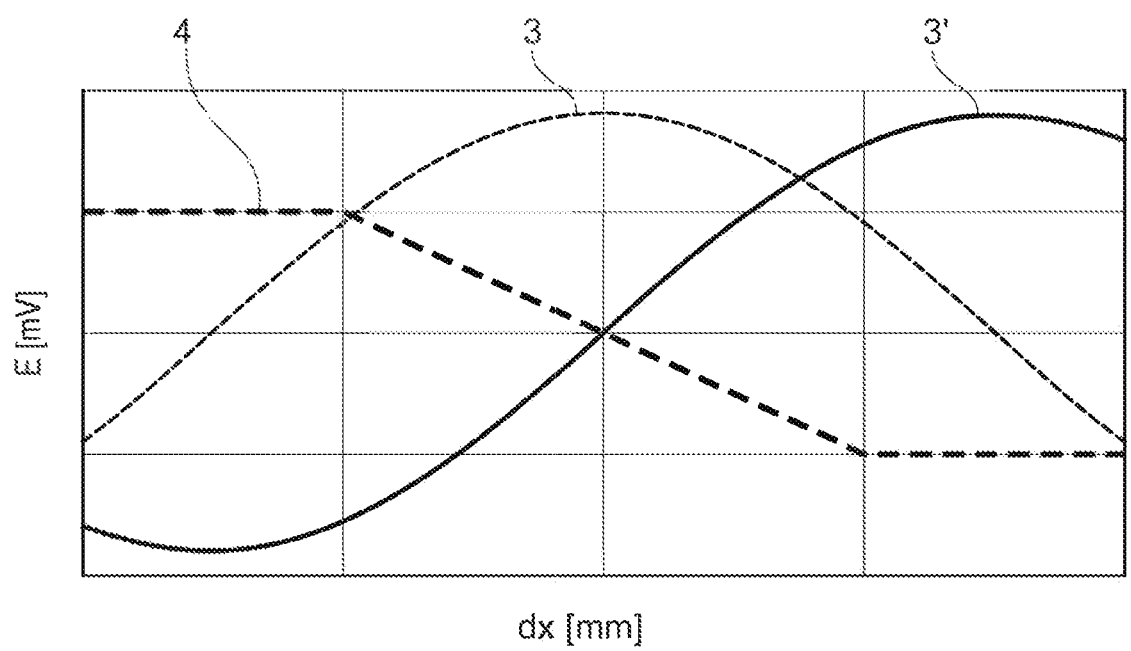
FIG. 4 shows the (useful) signals of the secondary coils and the calibration coil of the linear displacement sensor according to FIG. 3.

FIG. 4 shows the (useful) signals of the secondary coils 3, 3' and the calibration coil 4 of the linear displacement sensor 1 according to FIG. 3. It can be seen how the signal from the calibration coil 4 has an unambiguous zero crossing in the center and a constant value on both sides of the center or zero crossing according to the geometry of the calibration coil.

Figure 5:
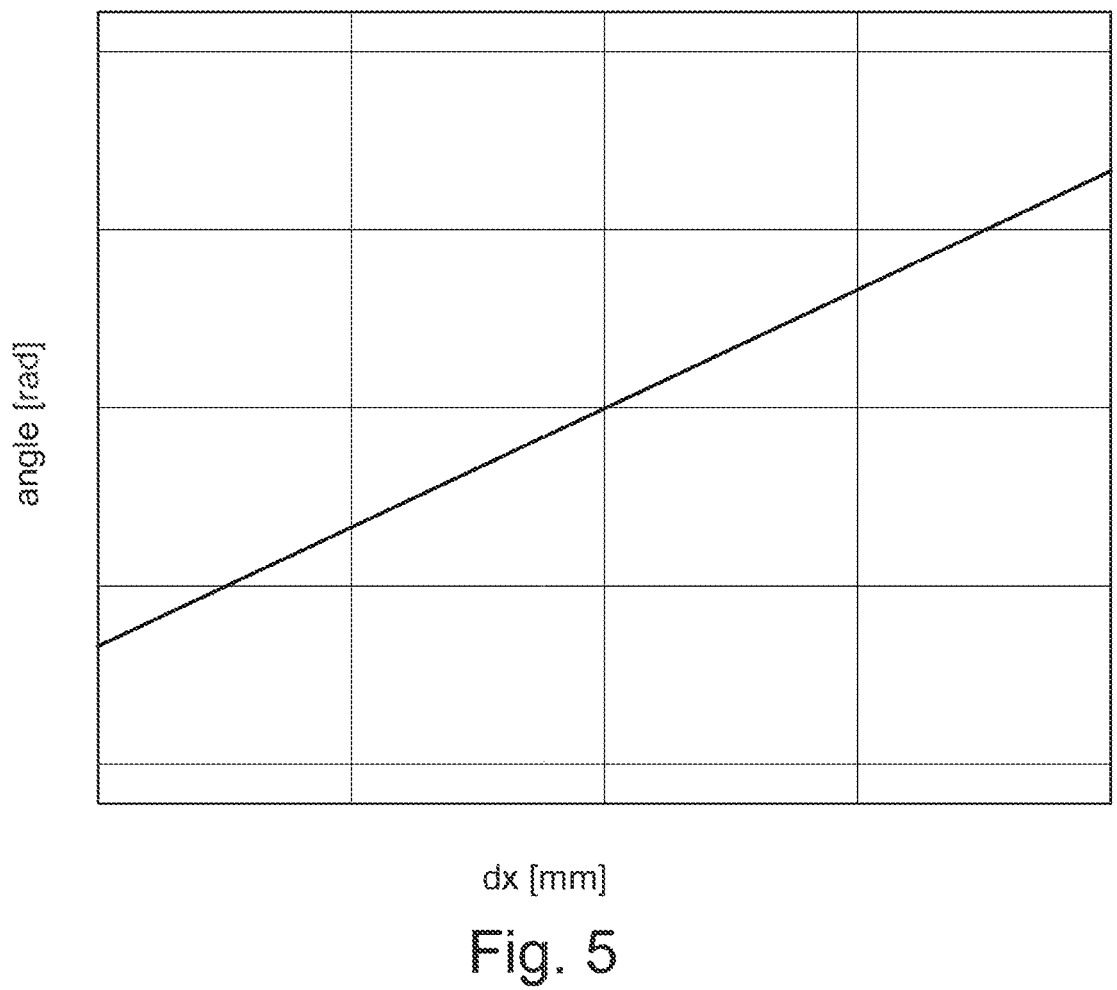
FIG. 5 shows a linear characteristic curve of the linear displacement sensor produced from the (useful) signals of the secondary coils according to FIG. 3.

Finally, FIG. 5 shows a linear characteristic curve of the linear displacement sensor 1 produced from the (useful) signals of the secondary coils 3, 3' according to FIG. 3. With the aid of the signal from the calibration coil 4, the center can be determined precisely, allowing for a simple calibration of the linear displacement sensor. The curve shown here was determined from the voltages induced and measured in the secondary coils using the arctangent 2 function (also known as arctan 2 or a tan 2 function).

The invention claimed is:

1. An inductive linear displacement sensor, comprising:
   a primary coil,
   two secondary coils inductively coupled to the primary coil,
   a calibration coil inductively coupled to the primary coil, and
   the calibration coil is arranged such that a signal produced by the calibration coil has only one zero crossing at the center of the inductive linear displacement sensor.

2. The inductive linear displacement sensor according to claim 1, wherein the inductive linear displacement sensor is configured to be planar.

3. The inductive linear displacement sensor according to claim 1, wherein:
   the inductive linear displacement sensor is configured as a circuit board, and
   the primary coil, the two secondary coils, and the calibration coil are configured as single-layer or multilayer conductive tracks.

4. The inductive linear displacement sensor according to claim 3, wherein:
   the circuit board is configured with multiple layers, and
   the primary coil, the two secondary coils, and the calibration coil are arranged in an uppermost plane of the circuit board, and
   in a plane below the uppermost plane, at least one control electronics unit is arranged, the at least one control electronics unit configured for at least one of: i) operating the primary coil, and ii) processing signals produced by the secondary coils, and
   one of the at least one control electronics unit for processing the signals produced by the secondary coils is configured as an integrated circuit.

5. The inductive linear displacement sensor according to claim 1, wherein the inductive linear displacement sensor is encapsulated by a plastic material.

6. The inductive linear displacement sensor according to claim 1, further comprising an operational amplifier configured for at least one of detecting the signal produced by the calibration coil or processing the signal produced by the calibration coil.

7. The inductive linear displacement sensor according to claim 1, wherein the secondary coils are configured in a sinusoidal geometry shifted relative to one another, and the primary coil is configured in a rectangular geometry.

8. The inductive linear displacement sensor according to claim 1, wherein the primary coil is operated with s high-frequency, alternating field.

9. A system comprising an inductive linear displacement sensor according to claim 1 and a position sensor movably arranged therewith in a linear direction relative to the inductive linear displacement sensor.

10. A method for determining linear displacement with an inductive linear displacement sensor according to claim 1, wherein the primary coil is operated with an alternating field, and a characteristic curve of the inductive linear displacement sensor is calibrated with respect to the center of the inductive linear displacement sensor via the signal produced by the calibration coil.

11. The inductive linear displacement sensor of claim 7, wherein the secondary coils are shifted relative to one another by $\pi/2$.

12. The inductive linear displacement sensor according to claim 1, wherein the calibration coil includes a first triangle and a second triangle, and the first triangle is connected to the second triangle via a first apex of the first triangle and a second apex of the second triangle.

13. The inductive linear displacement sensor according to claim 1, wherein the primary coil forms a rectangle, and the two secondary coils are arranged within the rectangle.

14. An inductive linear displacement sensor, comprising:
a primary coil,
two secondary coils inductively coupled to the primary coil, the two secondary coils arranged within the primary coil,
a calibration coil inductively coupled to the primary coil, and
the calibration coil is arranged such that a signal produced by the calibration coil has only one zero crossing at the center of the inductive linear displacement sensor.

15. The inductive linear displacement sensor according to claim 14, wherein the secondary coils are configured in a sinusoidal geometry shifted relative to one another.

16. The inductive linear displacement sensor of claim 1, wherein the calibration coil is independent of the two secondary coils.

17. The inductive linear displacement sensor of claim 14, wherein the calibration coil is independent of the two secondary coils.

18. The inductive linear displacement sensor of claim 1, wherein the signal comprises a first constant value on a first side of the only one zero crossing and a second constant value on a second side of the only one zero crossing.

19. The inductive linear displacement sensor of claim 18, wherein a sign of the first constant value is positive, and a sign of the second constant value is negative.

* * * * *